United States Patent [19]
Shieh

[11] Patent Number: 5,214,982
[45] Date of Patent: Jun. 1, 1993

[54] LOCKING DEVICE FOR A RATCHET WHEEL

[76] Inventor: Jin-Ren Shieh, No. 178, Shih Chia Rd., Taichung, Taiwan

[21] Appl. No.: 859,748

[22] Filed: Mar. 30, 1992

[51] Int. Cl.$^5$ .................. G05G 1/00; B60R 25/02; F16D 11/06
[52] U.S. Cl. .................. 74/575; 74/577 R; 74/578; 74/577 M; 74/DIG. 3; 74/186; 192/41 R; 192/45; 192/114 R; 188/78
[58] Field of Search .................. 74/575, 576, 577 R, 74/577 S, 577 SF, 577 M, 578; 70/DIG. 9, 184–186; 192/41 R, 45, 53 H, 43.1, 46, 71, 114 R; 188/78

[56] References Cited

U.S. PATENT DOCUMENTS

| | | | |
|---|---|---|---|
| 1,844,345 | 2/1932 | Carr | 188/78 |
| 1,850,898 | 3/1932 | Smith | 188/78 |
| 4,509,349 | 4/1985 | Partridge | 70/185 X |
| 4,576,024 | 3/1986 | Weber | 70/186 X |
| 4,581,909 | 4/1986 | Weber | 70/186 |
| 4,754,859 | 7/1988 | Ouchi et al. | 192/45 |
| 4,759,203 | 7/1988 | Lieb et al. | 70/185 |
| 5,067,598 | 11/1991 | Ritter et al. | 192/41 R X |
| 5,099,972 | 3/1992 | Ouchi | 192/45 |

FOREIGN PATENT DOCUMENTS

| | | | |
|---|---|---|---|
| 1242424 | 8/1960 | France | 192/41 R |
| 1342787 | 10/1987 | U.S.S.R. | 188/78 |

*Primary Examiner*—Vinh T. Luong
*Attorney, Agent, or Firm*—Cushman, Darby & Cushman

[57] ABSTRACT

A ratchet wheel having a locking device, includes a housing, a ratchet wheel disposed pivotally in the housing in such a manner that one end of its axle couples with an external rotating object, a braking member having a shank provided at one end thereof with a wedge angle and at other end thereof with a pivot, and a lock. The pivot is coupled pivotally with the housing in such a way that it moves between a first position and a second position. When the braking member is at the first position, its wedge angle meshes with ratchet wheel. When the braking member is at the second position, its wedge angle disengages from the ratchet wheel. The lock has a lock core capable of moving between a locking position and an unlocking position. The locking position of the lock core corresponds to the first position of the braking member, while the unlocking position of the lock core corresponds to the second position of the braking member.

4 Claims, 4 Drawing Sheets

LOCKING DEVICE FOR A RATCHET WHEEL

BACKGROUND OF THE INVENTION

The present invention relates to a locking device, and more particularly to a locking device for a ratchet wheel.

The locking device for a ratchet wheel disclosed previously by this inventor in Taiwanese Patent 79213029 is provided with a sector braking member, which has a serrated top portion and is coupled with a rotor fitted over with a protective shell provided with a toothed ring. The rotor is locked in place at the time when the serrated top portion of the sector braking member meshes with the toothed ring of the protective shell of the rotor. In addition, the braking member is coupled with a lock core of locking means by means of a clutching mechanism made up of a pair of bevel wheels and a spring disposed between the two bevel wheels. Therefore, the effectiveness of braking on the rotor by the braking member can be controlled by the unlocking and the locking actions of the locking device.

According to the manufacturing experience of this inventor, the locking device described above is defective in design in that the disengagement of the serrated portion of braking member from the toothed ring of the protective shell of rotor does not take place easily. In other words, it is often difficult to have the locking device shifted from a locking state to an unlocking state. Furthermore, the two bevel wheels fail to engage at times, thereby resulting in a failure of the lock core to actuate the braking member synchronously.

SUMMARY OF THE INVENTION

It is, therefore, the primary objective of the present invention to provide an improved locking device for a ratchet wheel, which overcomes the drawbacks of the locking device of the prior art described above.

In keeping with the principles of the present invention, the primary objective of the present invention is accomplished by an improved locking device for a ratchet wheel, which comprises a housing, a ratchet wheel, a braking member, and a locking means. The ratchet wheel is arranged pivotally in the housing, with one end of its axle located outside the housing for coupling with a rotating object. The braking member is disposed in the housing in such a manner that it is capable of moving between a first position and a second position, and that it engages the ratchet wheel when located at the first position, and further that it disengages the ratchet wheel when located at the second position. The locking means received in the housing has a lock core coupled with the braking member. The locking position of the lock core corresponds to the first position of the braking member, while the unlocking position of the lock core is in agreement with the second position of the braking member. The ratchet wheel locking device of the present invention is characterized in that its braking member has a shank, a wedge angle located at one end of the shank, and a pivot located at other end of the shank. The pivot is fastened pivotally to the housing so as to allow the shank to move between the first position and the second position. When the shank of the braking member moves to the first position, the wedge angle of the braking member engages the teeth of the ratchet wheel so as to exert a braking effect on the ratchet wheel in only one direction.

The locking device of the present invention is further characterized in that it is composed of a rotor received in the housing in such a manner that it is coaxial with the lock core of the locking means. There is a blind hold in the circumferential surface of the rotor. The blind hole contains a spring, which is urged insistently by a pin. The rotor further comprises a recessed portion located in its end facing the lock core disposed in the locking means in such a way that it is capable of moving axially between the first position and the second position. The lock core is provided at one end thereof with a projection, which is received in the recessed portion of the rotor when the lock core moves to the second position from the first position so as to actuate the rotor synchronously.

DETAILED DESCRIPTION OF THE PREFERRED EMBODIMENT

Figure 1:
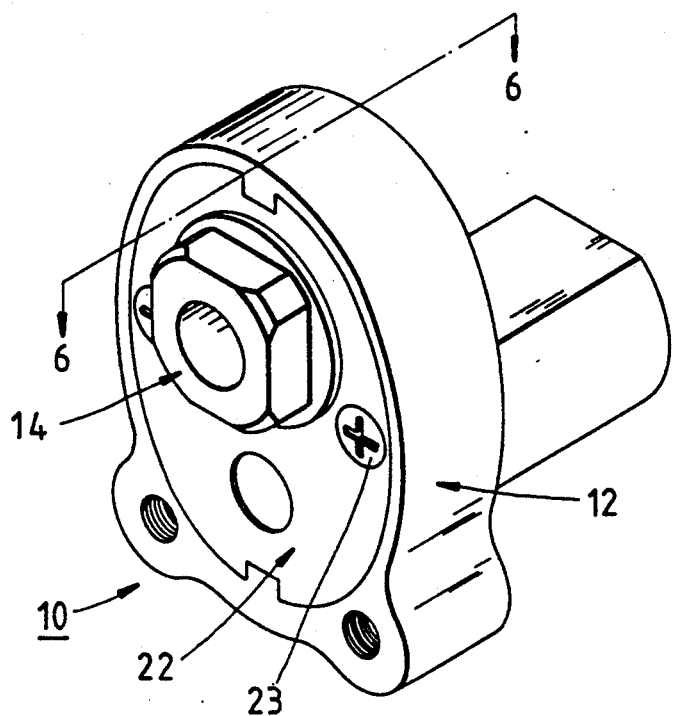
FIG. 1 shows a perspective view of a preferred embodiment of the present invention in an assembled condition.
Figure 3:
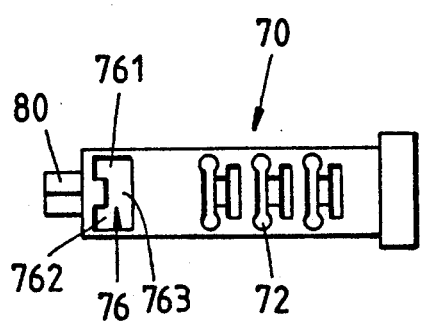
FIG. 3 shows a plan view of a lock core of the preferred embodiment of the present invention.
Figure 2:
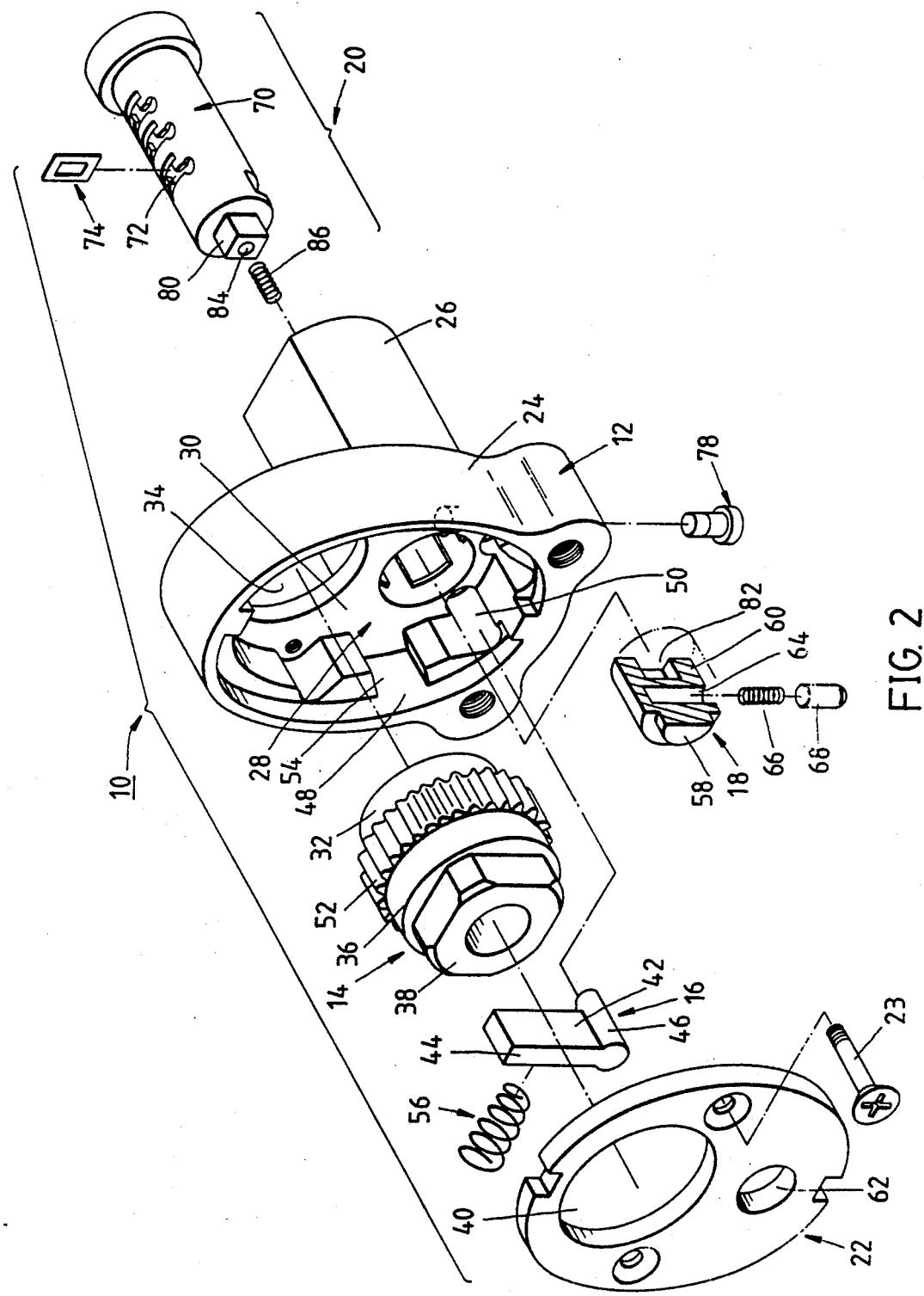
FIG. 2 shows an exploded perspective view of the preferred embodiment of the present invention.

Referring to the drawings attached, the locking device 10 of the present invention is shown comprising a housing 12, a ratchet wheel 14, a braking member 16, a rotor 18, and a locking means 20. In addition, a cover 22 is fastened securely to the open end of the housing 12 by means of two bolts 23.

The housing 12 is composed of an elliptical main body 24 having an open end and a centrally-located receiving space 28, and of a cylindrical portion 26 extending outwardly from the bottom wall 30 of the main body 24.

The ratchet wheel 14 is accommodated in the receiving space 28 and has a first circular flange 32 located at one end of its axle and dimensioned to fit into a circular hole 34 located at the upper portion of the bottom wall 30. The other end of the axle of the ratchet wheel 14 is provided with a second circular flange 36 and a square flange 38. The second circular flange 36 is fastened securely in a round hole 40 of the cover 22 in such a manner that the square flange 38 extends beyond the round hole 40 so as to couple with a rotating object.

Figure 4:
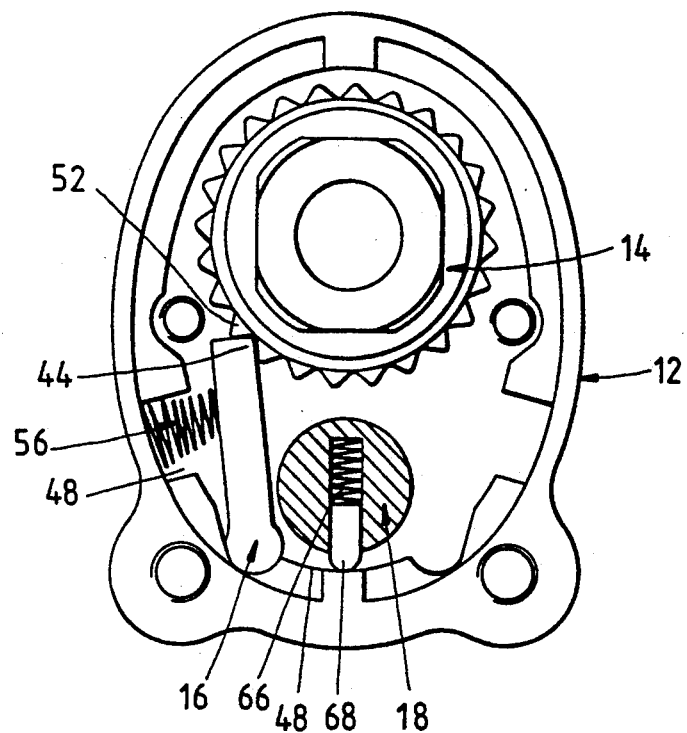
FIG. 4 shows a plan view of a portion of the preferred embodiment of the present invention in an assembled condition with the braking member situated at the first position.

The braking member 16 disposed in the receiving space 28 and under the ratchet wheel 14 has a shank 42, which, in turn, is composed of a wedge angle 44 located at the upper end thereof and a pivot 46 located at the lower end thereof. In combination, the pivot 46 is fitted into a slot 50 located at the lower portion of the inner wall surface of the main body 24 so that the shank 42 is capable of moving between a first position and a second position. When the shank 42 moves toward the first position, the wedge angle 44 engages the ratchet teeth 52 of the ratchet wheel 14, thereby resulting in a counterclockwise braking action on the ratchet wheel 14. The inner wall surface 48 of the main body 24 contains a receiving slot 54 located at a position opposite to the shank 42. A first coil spring 56 is lodged in the receiving slot 54 in such a manner that its open end urges the shank 42 so as to make the braking member 16 to remain always at the first position, as shown in FIG. 4.

Figure 5:
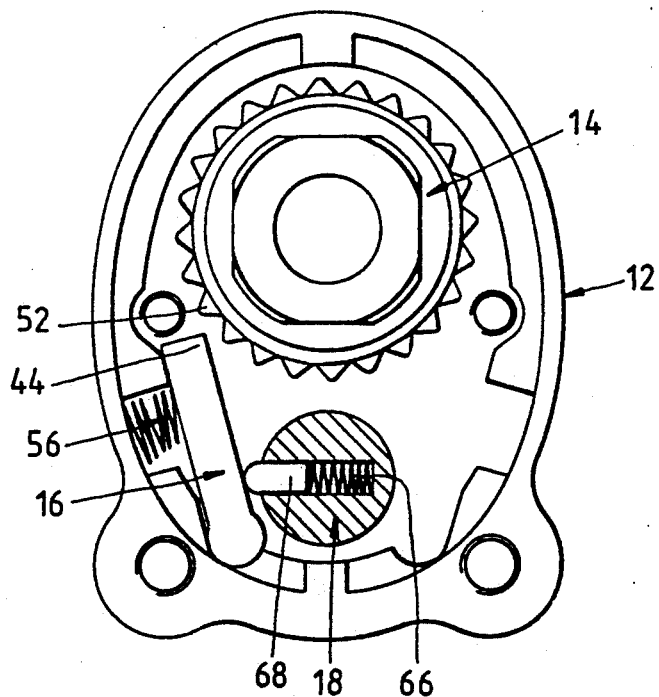
FIG. 5 shows a plan view of a portion of the preferred embodiment of the present invention in an assembled condition, with the braking member situated at the second position.

The rotor 18 of cylindrical construction accommodated in the receiving space 28 beside the braking member 16 is composed of a narrow portion 58 and a wide portion 60. In combination, the narrow portion 58 is received securely in a small round hole 62 of the cover 22 so as to fasten the rotor 18. The wide portion 60 is provided in the circumference thereof with a blind hole 64, in which a second coil spring 66 and a pin 68 are lodged. At the operating threshold of the rotor 18, the pin 68 is situated at a position corresponding to six o'clock in such a manner that it presses against the bottom of the inner wall surface 48, as shown in FIG. 4. When the rotor 18 has completed a 90-degree rotation, the pin 68 shifts to a position corresponding to nine o'clock so as to urge the shank 42 of the braking member 16. As a result, the wedge angle 44 of the braking member 16 disengages the ratchet wheel 14, as shown in FIG. 5. In other words, the rotor 18 has to make a 90-degree rotation in order that the pin 68 exerts a force on the braking member 16 to move toward the second position from the first position. When the rotation of the rotor 18 is under way, the second coil spring 66 serves to lessen impact between antagonistic forces. Therefore, when the braking member 16 has completely stopped the motion of the ratchet wheel 14, the braking member 16 can be still moved easily to the second position from the first position even if a torsion exists in the braking direction.

The locking means 20 has a lock core 70 provided with a plurality of grooves 72, each of which contains a barrier 74 whose structure and function are similar to those of the prior art and will not be further expounded. In combination, the lock core 70 and each of the barriers 74 are all contained in the cylindrical portion 26 in such a manner that the lock core 70 can rotate and move axially. The lock core is further provided with a U-shaped groove 76 serving to receive a guide pin 78 fastened to the cylindrical portion 26 and having two upright grooves 761 and 762. The length of the upright groove is the maximum distance that the lock core 70 can travel axially. In addition, the U-shaped groove 76 further comprises a horizontal groove 763. The angle corresponding to the arc length of the horizontal groove 763 is the one that the lock core 70 can rotate. The length of the upright groove 761 or 762 is about 4 mm, while the angle corresponding to the arc length of the horizontal groove 763 is on the order of 90 degrees. The lock core 70 is still further provided at one end thereof with a projection 80 having a cavity 84 containing a third coil spring 86. The open end of the projection 80 is in contact with the bottom surface of a recessed portion 82 of the rotor 20.

Figure 6:
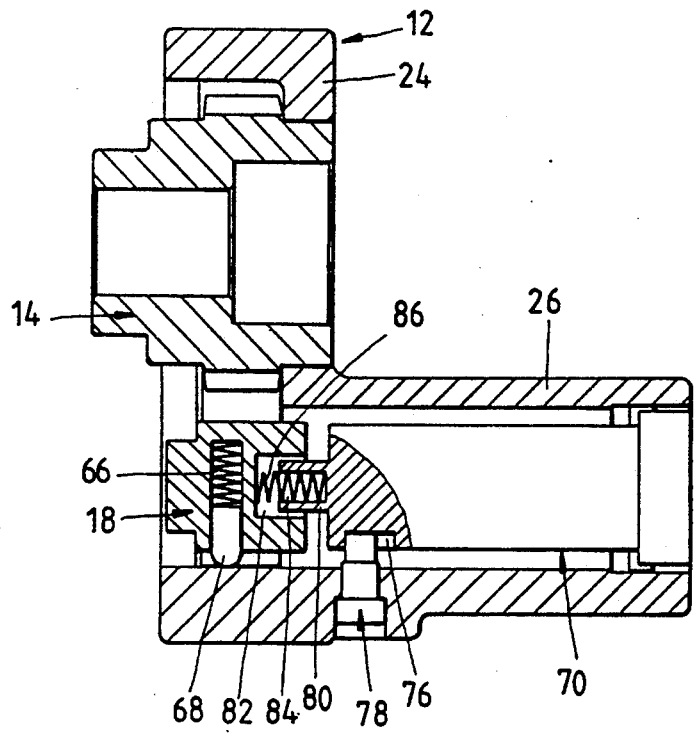
FIG. 6 shows a cut-away view of the portion taken along the line 6—6 of FIG. 1, with the lock core not being pressed inwardly.

When an axial movement of the lock core 70 takes place, the guide pin 78 is located at the end of the upright groove 761 or 762. Under such circumstance, the lock core 70 can not be rotated, as shown in FIG. 6.

Figure 7:
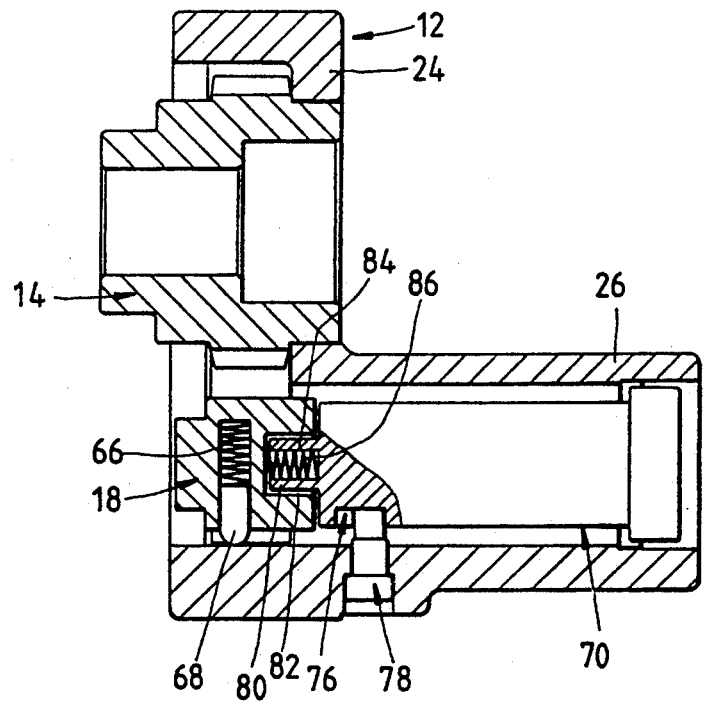
FIG. 7 shows a cut-away view of the portion taken along the line 6—6 of FIG. 1, with the lock core being pressed inwardly.

When the lock core 70 is pushed inwardly by a key inserted thereinto, the lock core 70 is guided by the guide pin 78 to move axially along the upright groove 761 or 762 to the end of the horizontal groove 763 so that the projection 80 is completely received in the recessed portion 82, as shown in FIG. 7. As a result, both the lock core 70 and the rotor 18 rotate synchronously. As soon as the rotor 18 has completed a 90-degree rotation, the pin 68 is located at a position corresponding to six or nine o'clock so that the position of the braking member 16 can be changed. As soon as the inward pressure exerting on the lock core 70 has dissipated, the lock core 70 can move along the upright groove 761 or 762 to return to its initial position. It must be noted here, that the projection 80 is still partially received in the recessed portion 82 at the time when the lock core 70 has not been pushed inwardly. Such design serves to ensure that the projection 80 is received in the recessed portion 82 when the lock core 70 is pushed inwardly, as shown in FIG. 6.

In the process of operating the locking device 10 of the present invention, the rotating shaft of an external object must be coupled with the square flange 38 of the ratchet wheel 14. If an operator wishes to have the external object locked unidirectionally, he or she should insert the key into the lock core 70 and rotate clockwise to make a 90-degree rotation so as to make the lock core 70 to shift to a locking position from an unlocking position. In the meantime, the braking member 16 also moves to the first position from the second position, as shown in FIG. 4, thereby bringing about a counterclock-wise braking action on the ratchet wheel 14. In other words, the external object is locked in a counterclockwise direction. On the contrary, the external object can be rotated at will in any direction by inserting the key into the lock core 70 to make a 90-degree rotation in a counterclockwise direction so as to cause the braking member 16 to disengage the ratchet wheel 14, as shown in FIG. 5.

What is claimed is:

1. A ratchet wheel having a locking device, comprising:

a housing having first and second, axially opposite end wall means and peripheral wall means defining a receiving space;

a ratchet wheel received in said space and journalled with respect to said housing for angularly reversible rotation about a longitudinal axis thereof, said ratchet wheel having a circumferentially extending series of ratchet teeth; a longitudinally extending flange provided on one end of said ratchet wheel and protruding out of said space through opening means provided in one of said end wall means, said flange being provided outside said housing with surface means which are engageable with an externable rotatable object so as to couple said ratchet wheel to the external rotatable object for rotation therewith;

a braking member accommodated in said housing, said braking member comprising a pivot portion, a shank projecting from said pivot portion and having a wedge angle formed at an outer end thereof, said pivot portion being journalled with respect to said housing for pivotal movement about an axis parallel to said longitudinal axis between a first position in which said wedge angle of said shank effectively meshes with said teeth of said ratchet wheel for preventing rotation of said ratchet wheel, and therefore, said external rotatable object in one angular direction about said longitudinal axis, and a second position in which said wedge angle is effectively withdrawn from meshing engagement with said teeth of said ratchet wheel for permitting rotation of said ratchet wheel, and therefore said external rotatable object, in said one angular direction; a first resilient biasing means effectively engaged between said housing and said braking member for tending to return said braking member to said first position from said second position;

a rotor means received in said housing; and a locking means received in said housing and including a lock core which, in use, is effectively coupled by said rotor means with said braking member, and journalled for rotation between a locking position which corresponds to said first position of said braking member and an unlocking position which corresponds to said second position of said braking member;

said rotor means including:

a rotor arranged for connection with said lock core for rotation therewith, said rotor having an outer peripheral surface; means defining a blind hole in said rotor through said outer peripheral surface;

a pin slidingly socketed in said blind hole for greater and lesser projection beyond said outer peripheral surface of said rotor;

a second resilient biasing means received in said blind hole and effectively engaged between said rotor and said pin for tending to urge said pin towards greater projection beyond said outer peripheral surface of said rotor;

said pin being arranged to engaged said shank of said braking member for pivoting said braking member from said first position to said second position against biasing force provided by said first resilient biasing means upon rotation of said lock core to said unlocking position, and for effectively disengaging from said shank of said braking member for allowing said biasing force provided by said first resilient biasing force to pivot said braking member from said second position to said first position.

2. The ratchet wheel having a locking device of claim 1, wherein:

said locking means is further journalled in said housing for axially sliding movement between an axially inner position of use, wherein an axial projection provided on said lock core drivingly engages in an axial recess provided in said rotor, and an axially outer position in which said axial projection is axially withdrawn out of said axial recess of said rotor and therefore driving engagement with said rotor.

3. The ratchet wheel of claim 2, further comprising:
a pin provided on said housing and slidingly received in an axially and angularly extending slot provided in said lock core for limiting movement of said lock core to axial sliding between said axially outer and axially inner positions, and to said locking and unlocking positions when in said axially inner position.

4. The ratchet wheel of claim 2, further comprising:
a third resilient biasing means received in said axial recess and effectively engaged between said rotor and said lock core, for tending to urge said lock core from said axially inner position thereof towards said axially outer position thereof.

* * * * *